United States Patent
Harada et al.

(10) Patent No.: US 7,510,605 B2
(45) Date of Patent: *Mar. 31, 2009

(54) DYE INK, INK JET RECORDING METHOD, INK SHEET, COLOR TONER AND COLOR FILTER

(75) Inventors: Toru Harada, Minami-Ashigara (JP); Yoshiharu Yabuki, Minami-Ashigara (JP); Takashi Ozawa, Fujinomiya (JP); Keiichi Tateishi, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 10/573,117

(22) PCT Filed: Feb. 3, 2005

(86) PCT No.: PCT/JP2005/001977

§ 371 (c)(1),
(2), (4) Date: Mar. 23, 2006

(87) PCT Pub. No.: WO2005/075573

PCT Pub. Date: Aug. 18, 2005

(65) Prior Publication Data

US 2008/0199615 A1    Aug. 21, 2008

(30) Foreign Application Priority Data

| Feb. 6, 2004 | (JP) | ............................. 2004-030288 |
| Jul. 20, 2004 | (JP) | ............................. 2004-211241 |
| Oct. 20, 2004 | (JP) | ............................. 2004-305665 |

(51) Int. Cl.
C09D 11/00    (2006.01)
C09D 11/02    (2006.01)
C09B 31/143   (2006.01)

(52) U.S. Cl. .................. 106/31.48; 106/31.52; 534/758; 534/764

(58) Field of Classification Search ............. 106/31.48, 106/31.5, 31.52; 534/756, 758, 764, 797
See application file for complete search history.

(56) References Cited

U.S. PATENT DOCUMENTS

| 4,737,190 | A |  | 4/1988 | Shimada et al. |
| 6,238,442 | B1 |  | 5/2001 | Schumacher et al. |
| 6,281,917 | B1 |  | 8/2001 | Katsuragi et al. |
| 6,319,309 | B1 | * | 11/2001 | Lavery et al. ............. 106/31.27 |
| 6,878,196 | B2 | * | 4/2005 | Harada et al. ............. 106/31.48 |
| 6,923,855 | B2 | * | 8/2005 | Harada et al. ............. 106/31.48 |
| 6,939,399 | B2 | * | 9/2005 | Yabuki ..................... 106/31.48 |
| 7,086,726 | B2 | * | 8/2006 | Takashima et al. .......... 347/100 |
| 7,311,393 | B2 | * | 12/2007 | Taguchi et al. .............. 347/100 |
| 2003/0213405 | A1 | * | 11/2003 | Harada et al. ............. 106/31.48 |
| 2006/0016368 | A1 | * | 1/2006 | Ozawa et al. ............. 106/31.27 |
| 2006/0272544 | A1 | * | 12/2006 | Chino et al. ............. 106/31.52 |

FOREIGN PATENT DOCUMENTS

| EP | 1 437 388 A1 | 7/2004 |
| JP | 61-101574 | 5/1986 |
| JP | 10-279858 | 10/1998 |
| JP | 2002-146249 | 5/2002 |
| JP | 2003-277661 | 10/2003 |
| JP | 2003-277662 | 10/2003 |

OTHER PUBLICATIONS

Supplemental European Search Report, European Application No. 05710029.9-2102, dated Feb. 22, 2008.

* cited by examiner

*Primary Examiner*—Helene Klemanski
(74) *Attorney, Agent, or Firm*—Buchanan Ingersoll & Rooney PC

(57) ABSTRACT

To provide a dye which has a good hue, which can form an image showing a high fastness under various using conditions and environmental conditions, and which is particularly suited for an ink, the dye is represents by formula (1):
wherein $R_1$ and $R_2$ each independently represents a monovalent group, Z represents a nitrogen atom or a carbon atom to which a hydrogen atom or a monovalent group is bonded, and M represents a hydrogen atom or a cation, provided that the dye has two azo groups.

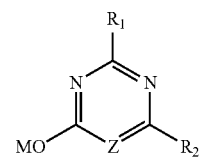

11 Claims, No Drawings

DYE INK, INK JET RECORDING METHOD, INK SHEET, COLOR TONER AND COLOR FILTER

TECHNICAL FIELD

The present invention relates to a dye, an ink, an ink jet recording method, an ink sheet, a color toner and a color filter.

BACKGROUND ART

In recent years, image recording materials have mainly been materials for forming color image and, specifically, ink jet recording materials, thermal transfer recording materials, electrophotographic recording materials, transfer process silver halide light-sensitive materials, printing inks and recording pens have popularly been utilized. Also, color filters for recording or reproducing color images have been used in imaging devices such as CCD in the field of photographing devices or in LCD or PDP in the field of display. In these color image recording materials or color filters, trichromatic dyes (dyes or pigments) based on additive color mixing or subtractive color process are used in order to display or record a full-color image. However, the fact is that there are no fast dyes which have absorption characteristics capable of realizing a preferable color-reproducible region and which can resist various using conditions and environmental conditions, thus improvement of the dyes having been eagerly desired.

Dyes for the above-described uses are commonly required to have the following characteristics. That is, they are required to have preferred absorption characteristics in view of color reproduction, to have fastness for environmental conditions under which they are used, such as light-fastness, heat resistance, humidity resistance, resistance against an oxidizing gas such as ozone, and resistance against chemicals such as a sulfurous acid gas, and to provide inks having an excellent storage stability. Thus, dyes which have a good yellow hue, a good fastness to light, a good fastness to heat and moisture and a good fastness to an active gas contained in environment, and which has an excellent storage stability have eagerly been desired.

As yellow dye skeleton to be used in an ink for ink jet recording, azo-based dyes are typical. As typical examples of the azo dyes, fast dyes having a triazinylpyrazole skeleton are described in JP-A-2003-277662. However, dyes capable of providing a more excellent storage stability are desired.

DISCLOSURE OF THE INVENTION

An object of the invention is to solve the problems with the conventional dyes and to attain the following subjects. That is, an object of the invention is to provide 1) a dye which has excellent color-reproducing characteristics as a dye for trichromatic system, which has a sufficient fastness to light, heat, humidity and environmental active gases, and which shows an excellent storage stability in an ink, 2) various coloring compositions capable of providing a colored image or colored material excellent in hue and fastness, such as a printing ink for, for example, ink jet printing, an ink sheet in a thermal recording material, a color toner for electrophotography, and a color filter for use in a display such as LCD or PDP or in an imaging device such as CCD, and 3) particularly, an ink for ink jet recording and an ink jet recording, which have an excellent storage stability and a good hue and which can form images having a high fastness to light, heat, humidity and environmental active gases, in particular, an ozone gas.

As a result of investing in detail pyrazolylazo dye derivatives for the purpose of finding dyes which can provide an ink showing a good storage stability, which show a good hue, and which have a high fastness to light, ozone, heat and moisture, the inventors have found that compounds represented by the following formula (1) can solve the above-mentioned problems, thus having achieved the invention. The means for solving the above-mentioned problems are as described below.

1. A dye represented by formula (1):

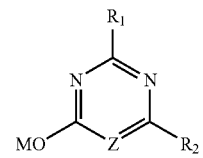

wherein $R_1$ and $R_2$ each independently represents a monovalent group, Z represents a nitrogen atom or a carbon atom to which a hydrogen atom or a monovalent group is bonded, and M represents a hydrogen atom or a cation, provided that the dye has two azo groups.

2. The dye according to item 1, wherein the dye represented by formula (1) is a dye represented by formula (2):

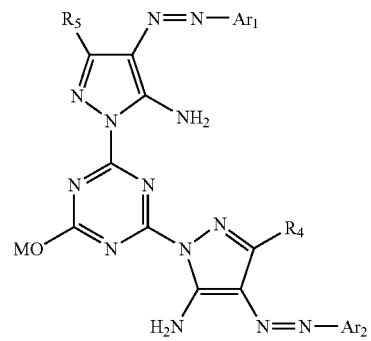

wherein $R_3$ and $R_4$ each independently represents a monovalent group, $Ar_1$ and $Ar_2$ each independently represents an aryl group or a hetero ring group, and M represents a hydrogen atom or a cation.

3. The dye according to item 2, wherein $Ar_1$ and $Ar_2$ each independently represents a group represented by formula (A):

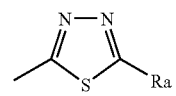

wherein Ra represents a monovalent group.

4. The dye according to item 1, wherein the dye represented by formula (1) is a dye represented by formula (3):

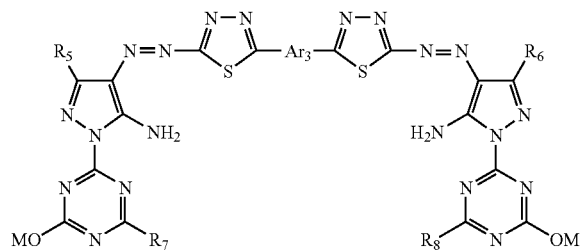

wherein $R_5$, $R_6$, $R_7$ and $R_8$ each independently represents a monovalent group, $Ar_3$ represents a divalent linking group, M represents a hydrogen atom or a cation.

5. The dye according to item 1, wherein the dye represented by formula (1) is a dye represented by formula (4):

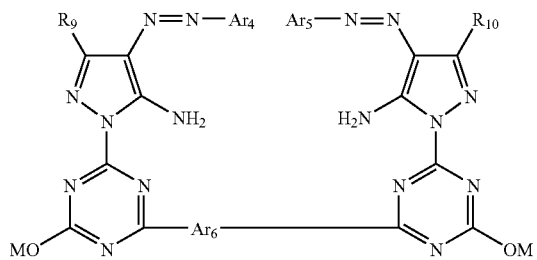

wherein $R_9$ and $R_{10}$ each independently represents a monovalent group, $Ar_4$ and $Ar_5$ each independently represents an aryl group or a hetero ring group, $Ar_6$ represents a divalent linking group, and M represents a hydrogen atom or a cation.

6. The dye according to item 5, wherein $Ar_3$ and $Ar_4$ each independently represents a group represented by formula (A):

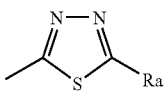

wherein Ra represents a monovalent group.

7. An ink comprising a dye according to any one of items 1 to 6.

8. An inkjet recording method comprising forming an image by using an ink according to item 7.

9. An ink sheet comprising a dye according to any one of items 1 to 6.

10. A color toner comprising a dye according to any one of items 1 to 6.

11. A color filter comprising a dye according to any one of items 1 to 6.

ADVANTAGES OF THE INVENTION

The dyes of the invention show an excellent storage stability in an ink, have excellent absorption characteristics as trichromatic dyes in color reproducibility and have sufficient fastness to light, heat, humidity and active gases in environment. Also, the dyes are useful for various coloring compositions capable of providing a colored image or colored material excellent in hue and fastness, such as a printing ink for, for example, ink jet printing, an ink sheet in a thermal recording material, a color toner for electrophotography, a color filter for use in a display such as LCD or PDP or in an imaging device such as CCD, and a dyeing solution for dyeing various fibers. In particular, use of the dye can provide an ink jet recording ink having an excellent storage stability and an ink jet recording method, which can form an image having a good hue and a high fastness to light and active gases in the environment, particularly an ozone gas.

DETAILED DESCRIPTION OF THE INVENTION

The invention is described in detail below.

(Azo Dyes)

The azo dyes in the invention are azo dyes represented by the foregoing formula (1).

Descriptions on formula (1) are given below.

The monovalent group represented by $R_1$, $R_2$ and Z are the same as the substituent for the aryl group to be described hereinafter.

The dye has two azo groups within the molecule in two types: (1) one type being those dyes which have one group having two azo groups as substituents within the molecule; and (2) the other type being those dyes which have two groups each having one azo group. As the former azo group-substituted group and the latter azo group having group, a hetero ring group is preferred. Preferred examples of the hetero ring constituting the hetero ring group include a 5-pyrazolone ring, a 5-aminopyrazole ring, an oxazolone ring, a barbituric acid ring, a pyridine ring, a rhodanine ring, a pyrazolidinedione ring, a pyrazolopyridone ring and a merdramic acid ring. Of these, a 5-pyrazolone ring and a 5-aminopyrazole ring are preferred, with a 5-aminopyrazole ring being particularly preferred.

In the invention, M represents a hydrogen arom or a cation. Examples of the cation represented by M include an alkali metal ion, ammonium and a quaternary ammonium cation. Of these, Li, Na, K, $NH_4$ and $NR_4$ are preferred, wherein R represents an alkyl group or an aryl group which is the same as an alkyl group or an aryl group to be described hereinafter.

Of the azo dyes represented by formula (1), those dyes which are represented by formula (2), (3) or (4) are preferred.

The monovalent group represented by $R_3$ and the monovalent group represented by $R_4$ in formula (2) each is the same as the substituent for the aryl group to be described hereinafter. Preferred examples thereof include an alkyl group, a cycloalkyl group, an aralkyl group, an alkoxy group, an aryl group, an amino group, a carboxyl group (optionally forming a salt), and a carbamoyl group, with an alkyl group (containing preferably 1 to 5 carbon atoms, such as methyl, ethyl, butyl or t-butyl) being more preferred. Detailed descriptions on these substituents are the same as with the substituents to be described hereinafter.

As the hetero ring of the hetero ring group represented by $Ar_1$ or $Ar_2$, 5- or 6-membered rings are preferred, which may further be condensed with other ring. Also, the hetero ring may be an aromatic hetero ring or a non-aromatic hetero ring. Examples thereof include pyridine, pyrazine, pyridazine, quinoline, isoquinoline, quinazoline, cinnoline, phthalazine, quinoxaline, pyrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. Of these, aromatic hetero rings are preferred. Preferred illustrative examples thereof include pyridine, pyrazine, pyridazine, pyrazole, imidazole, benzimidazole, triazole, benzoxazole, thiazole, benzothiazole, isothiazole, benzisothiazole and thiadiazole. More preferred examples thereof include imidazole, benzoxazole and thiadiazole, with thiadiazole (preferably 1,3,4-thiadiazole or 1,2,4-thiadiazole) being most preferred. These may have a substituent. Examples of the substituent are the same as with the substituents for the aryl group to be described hereinafter.

The aryl group represented by $Ar_1$ and the aryl group represented by $Ar_2$ each includes substituted and unsubstituted aryl groups. As the substituted or unsubstituted aryl group, an aryl group having 6 to 30 carbon atoms is preferred. Examples of the substituent for the aryl group include a halogen atom, an alkyl group, a cycloalkyl group, an aralkyl group, an alkenyl group, an alkynyl group, an aryl group, a hetero ring group, a cyano group, a hydroxy group, a nitro group, a carboxyl group (optionally forming a salt), an alkoxy group, an aryloxy group, a silyloxy group, a hetero ring oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a hetero ring thio group, a sulfamoyl group, a sulfo group (optionally forming a salt), an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group and a silyl group.

As the aryl group represented by $Ar_1$ and the aryl group represented by $Ar_2$, substituted phenyl groups (the substituent being preferably a carboxyl group or a sulfo group) are more preferred.

The substituents for the aryl group are described in more detail below.

The halogen atom is a chlorine atom, a bromine atom or an iodine atom.

The alkyl group includes a substituted alkyl group and an unsubstituted alkyl groups. As the substituted or unsubstituted alkyl group, alkyl groups having 1 to 30 carbon atoms are preferred. Examples of the substituents are the same as with the substituents for the aryl group. Among them, a hydroxy group, an alkoxy group, a cyano group, a halogen atom, a sulfo group (optionally forming a salt) and a carboxyl group (optionally forming a salt) are preferred. Examples of the alkyl group include methyl, ethyl, butyl, t-butyl, n-octyl, eicosyl, 2-chloroethyl, hydroxyethyl, cyanoethyl and 4-sulfobutyl.

The cycloalkyl group includes a substituted cycloalkyl group and an unsubstituted cycloalkyl group. The substituted or unsubstituted cycloalkyl group contains preferably 5 to 30 carbon atoms. Examples of the substituent are the same as the substituents for the aryl group. Examples of the cycloalkyl group include cyclohexyl, cyclopentyl and 4-n-dodecylcyclohexyl.

The aralkyl group includes a substituted aralkyl group and an unsubstituted aralkyl group. As the substituted or unsubstituted aralkyl group, aralkyl groups containing 7 to 30 carbon atoms are preferred. Examples of the substituent are the same with the substituent for the aryl group. Examples of the aralkyl group include benzyl and 2-phenethyl.

The alkenyl group is a straight, branched or cyclic, substituted or unsubstituted alkenyl group. Preferred examples thereof include a substituted or unsubstituted alkenyl group containing 2 to 30 carbon atoms, such as vinyl, allyl, prenyl, geranyl, oleyl, 2-cyclopenten-1-yl and 2-cyclohexen-1-yl.

The alkynyl group is a substituted or unsubstituted alkynyl group containing 2 to 30 carbon atoms, and is exemplified by ethynyl and propargyl.

The aryl group is a substituted or unsubstituted aryl group containing 6 to 30 carbon atoms, such as phenyl, p-tolyl, naphthyl, m-chlorophenyl and o-hexadecanoylaminophenyl.

The hetero ring group is a monovalent group formed by removing one hydrogen atom from an aromatic or non-aromatic hetero ring compound, and is more preferably a 5- or 6-membered aromatic hetero ring group containing 3 to 30 carbon atoms. Examples thereof include 2-furyl, 2-thienyl, 2-pyrimidinyl, 2-benzothiazolyl and morpholino.

The alkoxy group includes a substituted alkoxy group and an unsubstituted alkoxy group. As the substituted or unsubstituted alkoxy group, an alkoxy group containing 1 to 30 carbon atoms is preferred. Examples of the substituent are the same as with the substituents for the aryl group. Examples of the alkoxy group include methoxy, ethoxy, isopropoxy, n-octyloxy, methoxyethoxy, hydroxyethoxy and 3-carboxypropoxy.

The aryloxy group is a substituted or unsubstituted aryloxy group containing 6 to 30 carbon atoms, and is exemplified by phenoxy, 2-methylphenoxy, 4-t-butylphenoxy, 3-nitrophenoxy and 2-tetradecanoylaminophenoxy.

The silyloxy group is a silyloxy group containing 3 to 20 carbon atoms, and is exemplified by trimethylsilyloxy and t-butyldimethylsilyloxy.

The hetero ring oxy group is a substituted or unsubstituted hetero ring oxy group containing 2 to 30 carbon atoms, and is exemplified by 1-phenyltetrazol-5-oxy and 2-tetrahydropyranyloxy.

The acyloxy group is a formyloxy, a substituted or unsubstituted alkylcarbonyloxy group containing 2 to 30 carbon atoms or a substituted or unsubstituted arylcarbonyloxy group containing 6 to 30 carbon atoms, and is exemplified by formyloxy, acetyloxy, pivaloyloxy, stearoyloxy, benzoyloxy, p-methoxyphenylcarbonyloxy.

The carbamoyloxy group is a substituted or unsubstituted carbamoyloxy group containing 1 to 30 carbon atoms, and is exemplified by N,N-dimethylcarbamoyloxy, N,N-diethylcarbamoyloxy, morpholinocarbonyloxy, N,N-di-n-octylaminocarbonyloxy and N-n-octylcarbamoyloxy.

The alkoxycarbonyloxy group is a substituted or unsubstituted alkoxycarbonyloxy group containing 2 to 30 carbon atoms, and is exemplified by methoxycarbonyloxy, ethoxycarbonyloxy, t-butoxycarbonyloxy and n-octylcarbonyloxy.

The aryloxycarbonyloxy group is a substituted or unsubstituted aryloxycarbonyloxy group containing 7 to 30 carbon atoms, and is exemplified by phenoxycarbonyloxy, p-methoxyphenoxycarbonyloxy and p-n-hexadecyloxyphenoxycarbonyloxy.

The amino group is a substituted or unsubstituted alkylamino group containing 1 to 30 carbon atoms or a substituted or unsubstituted arylamino group containing 6 to 30 carbon atoms, and is exemplified by amino, methylamino, dimethylamino, anilino, N-methyl-anilino, diphenylamino, hydroxyethylamino, carboxyethylamino, sulfoethylamino and 3,5-dicarboxyanilino.

The acylamino group is a formylamino group, a substituted or unsubstituted alkylcarbonylamino group containing 1 to 30 carbon atoms or a substituted or unsubstituted arylcarbonylamino group containing 6 to 30 carbon atoms, and is exemplified by formylamino, acetylamino, pivaloylamino, lauroylamino, benzoylamino and 3,4,5-tri-n-octyloxyphenylcarbonylamino.

The aminocarbonylamino group is a substituted or unsubstituted aminocarbonylamino group containing 1 to 30 carbon atoms, and is exemplified by carbamoylamino, N,N-dimethylaminocarbonylamino, N,N-diethylaminocarbonylamino and morpholinocarbonylamino.

The alkoxycarbonylamino group is a substituted or unsubstituted alkoxycarbonylamino group containing 2 to 30 carbon atoms, and is exemplified by methoxycarbonylamino, ethoxycarbonylamino, t-butoxycarbonylamino, n-octadecyloxycarbonylamino and N-methyl-methoxycarbonylamino.

The aryloxycarbonylamino group is a substituted or unsubstituted aryloxycarbonylamino group containing 7 to 30 carbon atoms, and is exemplified by phenoxycarbonylamino, p-chlorophenoxycarbonylamino and m-n-octyloxyphenoxycarbonylamino.

The sulfamoylamino group is a substituted or unsubstituted sulfamoylamino group containing 0 to 30 carbon atoms, and is exemplified by sulfamoylamino, N,N-dimethylaminosulfonylamino and N-n-octylaminosulfonylamino.

The alkylsulfonylamino or arylsulfonylamino group is a substituted or unsubstituted alkylsulfonylamino group containing 1 to 30 carbon atoms or a substituted or unsubstituted arylsulfonylamino group containing 6 to 30 carbon atoms, and is exemplified by methylsulfonylamino, butylsulfonylamino, phenylsulfonylamino, 2,3,5-trichlorophenylsulfonylamino and p-methylsulfonylamino.

The alkylthio group is a substituted or unsubstituted alkylthio group containing 1 to 30 carbon atoms, and is exemplified by methylthio, ethylthio and n-hexadecylthio.

The arylthio group is a substituted or unsubstituted arylthio group containing 6 to 30 carbon atoms, and is exemplified by phenylthio, p-chlorophenylthio and m-methoxyphenylthio.

The hetero ring thio group is a substituted or unsubstituted hetero ring thio group containing 2 to 30 carbon atoms, and is exemplified by 2-benzothiazolylthio and 1-phenyltetrazol-5-ylthio.

The sulfamoyl group is a substituted or unsubstituted sulfamoyl group containing 0 to 30 carbon atoms, and is exemplified by N-ethylsulfamoyl, N-(3-dodecyloxypropyl)sulfamoyl, N,N-dimethylsulfamoyl, N-acetylsulfamoyl, N-benzoylsulfamoyl and N—(N'-phenylcarbamoyl)sulfamoyl.

The alkylsulfinyl or arylsulfinyl group is a substituted or unsubstituted alkylsulfinyl group containing 1 to 30 carbon atoms or a substituted or unsubstituted arylsulfinyl group containing 6 to 30 carbon atoms, and is exemplified by methylsulfinyl, ethylsulfinyl, phenylsulfinyl and p-methylphenylsulfinyl.

The alkylsulfonyl or arylsulfonyl group is a substituted or unsubstituted alkylsulfonyl group containing 1 to 30 carbon atoms or a substituted or unsubstituted arylsulfonyl group containing 6 to 30 carbon atoms, and is exemplified by methylsulfonyl, ethylsulfonyl, phenylsulfonyl and p-methylphenylsulfonyl.

The acyl group is a formyl group, an alkylcarbonyl group containing 2 to 30 carbon atoms, a substituted or unsubstituted arylcarbonyl group containing 7 to 30 carbon atoms or a hetero ring carbonyl group containing 4 to 30 carbon atoms, and is exemplified by acetyl, pivaloyl, 2-chloroacetyl, stearoyl, benzoyl, p-n-octyloxyphenylcarbonyl, 2-pyridylcarbonyl and 2-furylcarbonyl.

The aryloxycarbonyl group is a substituted or unsubstituted aryloxycarbonyl group containing 7 to 30 carbon atoms, and is exemplified by phenoxycarbonyl, o-chlorophenoxycarbonyl, m-nitrophenoxycarbonyl and p-t-butylphenoxycarbonyl.

The alkoxycarbonyl group is a substituted or unsubstituted alkoxycarbonyl group containing 2 to 30 carbon atoms, and is exemplified by methoxycarbonyl, ethoxycarbonyl, t-butoxycarbonyl and n-octadecyloxycarbonyl.

The carbamoyl group is a substituted or unsubstituted carbamoyl group containing 1 to 30 carbon atoms, and is exemplified by carbamoyl, N-methylcarbamoyl, N,N-dimethylcarbamoyl, N,N-di-n-octylcarbamoyl and N-(methylsulfonyl)carbamoyl.

The phosphino group is a substituted or unsubstituted phosphino group containing 2 to 30 carbon atoms, and is exemplified by dimethylphosphino, diphenylphosphino and methylphenoxyphosphino.

The phosphinyl group is a substituted or unsubstituted phosphinyl group containing 2 to 30 carbon atoms, and is exemplified by phosphinyl, dioctyloxyphosphinyl and diethoxyphosphinyl.

The phosphinyloxy group is a substituted or unsubstituted phosphinyloxy group containing 2 to 30 carbon atoms, and is exemplified by diphenoxyphosphinyloxy and dioctyloxyphosphinyloxy.

The phosphinylamino group is a substituted or unsubstituted phosphinylamino group containing 2 to 30 carbon atoms, and is exemplified by dimethoxyphosphinylamino and dimethylaminophosphinylamino.

The silyl group is a substituted or unsubstituted silyl group containing 3 to 30 carbon atoms, and is exemplified by trimethylsilyl, t-butyldimethylsilyl and phenyldimethylsilyl.

Of the substituents for the aryl group, those which have a hydrogen may be substituted at the hydrogen atom by the above-mentioned substituent, with the hydrogen atom being removed. Examples of such functional group include an alkylcarbonylaminosulfonyl group, an arylcarbonylaminosulfonyl group, an alkylsulfonylaminocarbonyl group and an arylsulfonylaminocarbonyl group. Specific examples thereof include methylsulfonylaminocarbonyl, p-methylphenylsulfonylaminocarbonyl, acetylaminosulfonyl and benzoylaminosulfonyl.

Of the dyes represented by the foregoing formula (2), dyes wherein $Ar_1$ and $Ar_2$ each independently represents the hetero ring group are preferred, and dyes wherein $Ar_1$ and $Ar_2$ each independently represents the foregoing formula (A) are more preferred.

In formula (A), Ra represents a monovalent group.

The monovalent group represented by Ra is the same as the monovalent group represented by $R_1$ or $R_2$ in formula (1), with the preferred range being also the same. More preferably, Ra represents -L-Ph or -Ph (wherein Ph represents a substituted or unsubstituted phenyl group, with the substituent being the same as the monovalent group represented by $R_1$ or $R_2$ in formula (1), and L represents a divalent linking group and is the same as $Ar_3$ in formula (3)). Still more preferably, Ra represents —S-Ph or -Ph (wherein Ph represents a substituted or unsubstituted phenyl group).

Detailed descriptions on formula (3) are given below. The monovalent group represented by $R_5$ and the monovalent group represented by $R_6$ each is the same as the monovalent group of $R_3$ or $R_4$. The monovalent group represented by $R_7$ and the monovalent group represented by $R_8$ each is the same as the aforesaid substituent for the aryl group. Further, $R_7$ and $R_8$ each preferably represents a halogen atom, OM (wherein M represents a hydrogen atom or a cation), an alkoxy group, an alkylthio group, an arylthio group, an amino group or a hetero ring group. These substituents are the same as has been described hereinbefore.

The divalent group represented by $Ar_3$ is preferably an alkylene group (e.g., methylene, ethylene, propylene, butylenes or pentylene), an alkenylene group (e.g., ethenylene or propenylene), an alkynylene group (e.g., ethynylene or propynylene), an arylene group (e.g., phenylene or naphthylene), a divalent hetero ring group (e.g., 6-chloro-1,3,5-triazine-2,4-diyl, pyrimidine-2,4-diyl, quinoxaline-2,3-diyl or pyridazine-3,6-diyl), —O—, —CO—, —NR— (wherein R represents a hydrogen atom, an alkyl group or an aryl group), —S—, $SO_2$—, —SO— or a combination thereof (e.g., —$NHCH_2CH_2NH$— or —NHCONH—).

The alkylene group, alkenylene group, alkynylene group, arylene group and divalent hetero ring group, and the alkyl group or the aryl group of R may have a substituent or substituents. Examples of the substituent are the same as with the substituent for the aryl group. The alkyl group and the aryl group of R are the same as defined hereinbefore.

More preferably, the divalent alkylene group is an alkylene group containing 10 or less carbon atoms, an alkenylene group containing 10 or less carbon atoms, an alkynylene group containing 10 or less carbon atoms, an arylene group containing 6 to 10 carbon atoms, —S—, —SO—, —$SO_2$— or a combination thereof (e.g., —$SCH_2CH_2S$— or —$SCH_2CH_2CH_2S$—).

The total number of carbon atoms of the divalent linking group is preferably from 0 to 50, more preferably from 0 to 30, most preferably 0 to 10.

Descriptions on formula (4) are given below. The monovalent group of $R_9$ and the monovalent group of $R_{10}$ each is the same as the monovalent group of $R_3$ or $R_4$ in formula (2). The aryl group and the hetero ring group represented by $Ar_4$, and the aryl group and the hetero ring group represented by $Ar_5$ are the same as the aryl group and the hetero ring group represented by $Ar_1$ or $Ar_2$ in formula (2), with the hetero ring group being preferred. The divalent linking group represented by $Ar_6$ is the same as the divalent linking group of $Ar_3$ in formula (3).

Of dyes represented by formula (2), (3) or (4), dyes represented by formula (2) are preferred.

In the invention, in the case where the compounds represented by formula (1), (2), (3) or (4) are required to be hydrophilic, it is preferred for the compounds to have two or more, more preferably 2 to 10, particularly preferably 3 to 6, hydrophilic groups within the molecule. However, in the case where water is not used as a medium, the compounds may not have the hydrophilic group.

As the hydrophilic group, any ionically dissociative group may be used. Specific examples thereof include a sulfo group, a carboxyl group (including the salt thereof), a hydroxyl group (optionally forming a salt), a phosphono group (optionally forming a salt) and a quaternary ammonium salt, with a sulfo group, carboxyl group and hydroxyl group (including the salt thereof) being preferred.

In view of color reproducibility, the dyes represented by formula (1), (2), (3) or (4) have a maximum absorption wavelength (λmax) of preferably from 380 to 490 nm, more preferably from 400 to 480 nm, particularly preferably from 420 to 460 nm, in $H_2O$.

Specific examples of the dyes represented by formula (1), (2), (3) or (4) are shown below (Illustrative dye 1 to 57). However, dyes to be used in the invention are not limited only to them.

The following specific examples are represented by a structure of a free acid but may be used in the state of a salt thereof. Preferred examples of a counter ion for the salt include an alkali metal (for example, lithium, sodium, and potassium), an ammonium and an organic cation (for example, pyridinium tetramethylammonium and guanidinium).

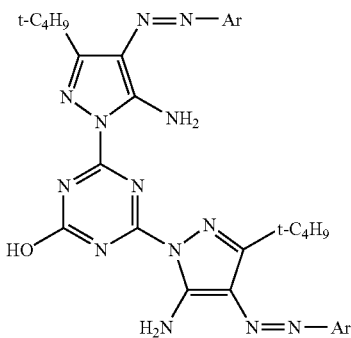

-continued
| | 11 | | 12 |
|---|---|---|---|
| 2 | 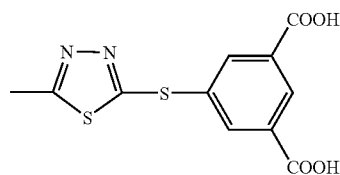 | 9 | 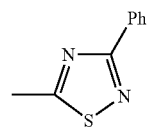 |
| 3 | 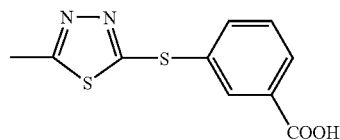 | 10 | 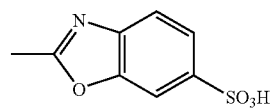 |
| 4 | 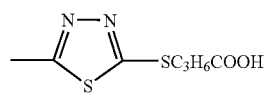 | 11 | 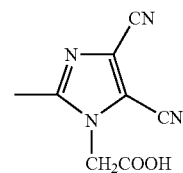 |
| 5 | 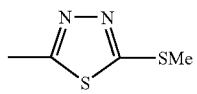 | 12 | 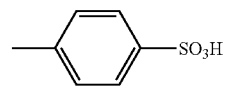 |
| 6 | 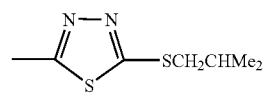 | 13 | 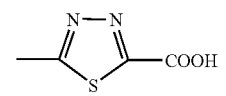 |
| 7 | 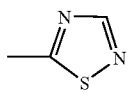 | | |
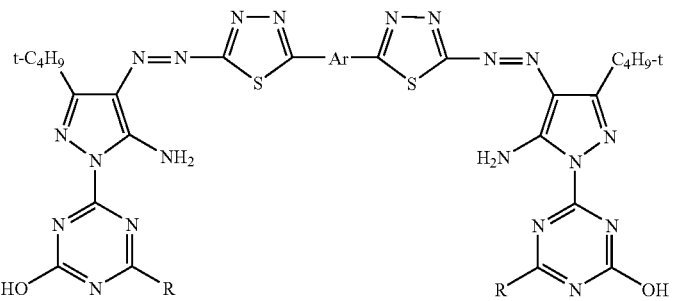
| Dye | R | Ar |
|---|---|---|
| 14 | OH | —SC$_2$H$_4$S— |
| 15 | OH | —SC$_3$H$_6$S— |
| 16 | OH | 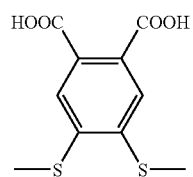 |
| 17 | OH | 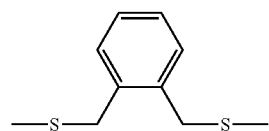 |

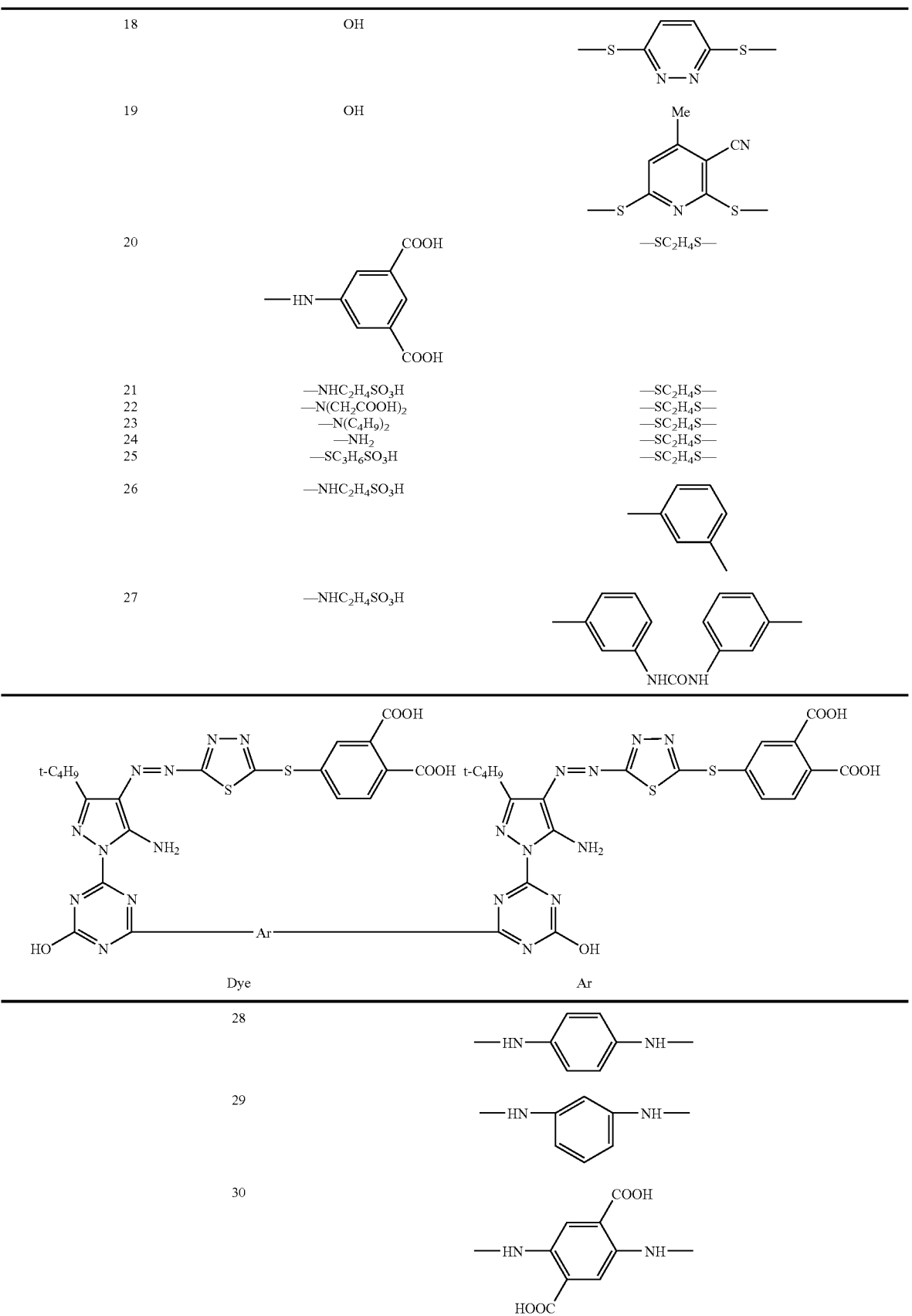

-continued
| | |
|---|---|
| 31 | 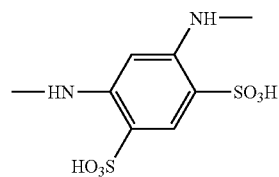 |
| 32 | 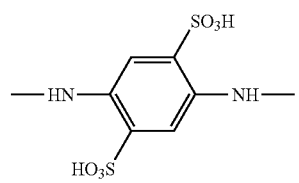 |
| 33 | —NHC₂H₄NH— |
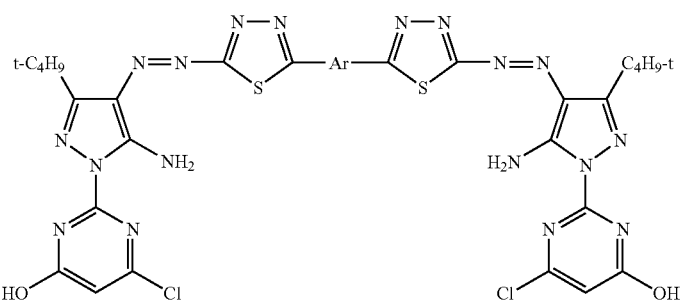
| Dye | Ar |
|---|---|
| 34 | —SC₂H₄S— |
| 35 | —SC₃H₆S— |
| 36 | 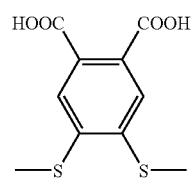 |
| 37 | 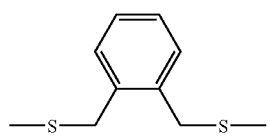 |
| 38 | 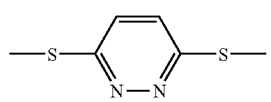 |
| 39 | 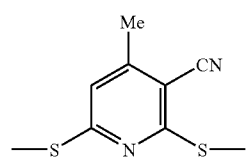 |

-continued
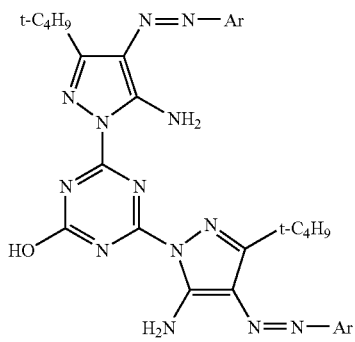
| Dye | Ar |
|---|---|
| 40 | 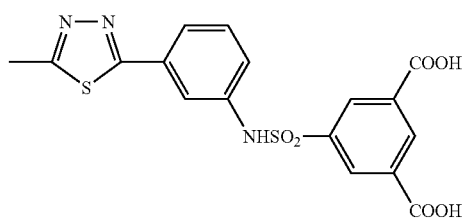 |
| 41 | 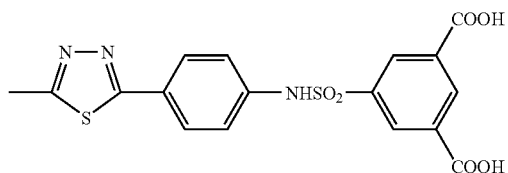 |
| 42 | 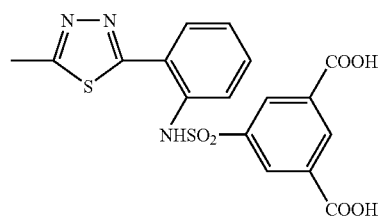 |
| 43 | 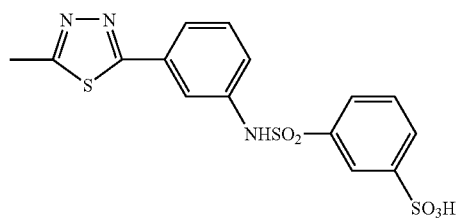 |
| 44 | 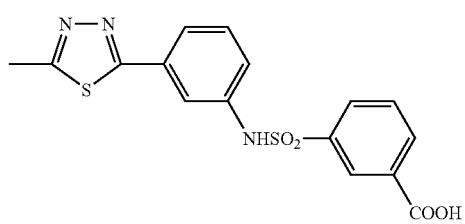 |

-continued
| | |
|---|---|
| 45 | 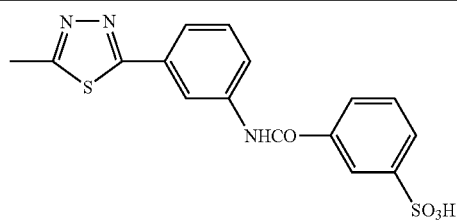 |
| 46 | 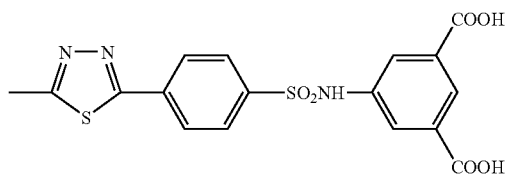 |
| 47 | 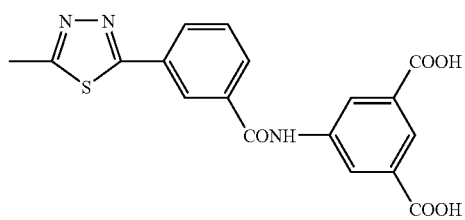 |
| 48 | 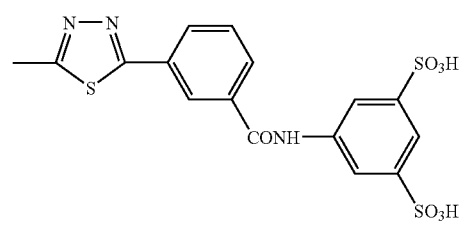 |
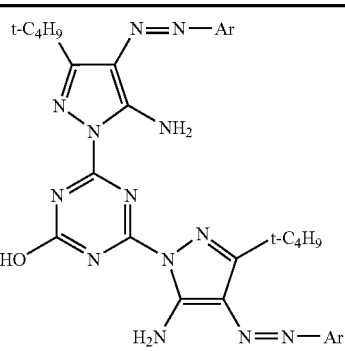
| Dye | Ar |
|---|---|
| 49 | 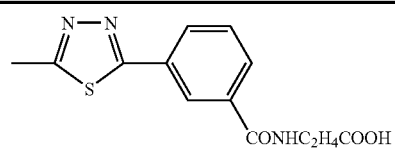 |
| 50 | 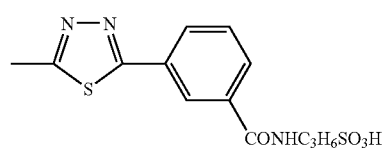 |

-continued

| | | |
|---|---|---|
| 51 | | 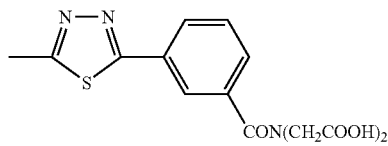 |
| 52 | | 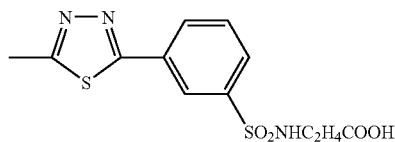 |

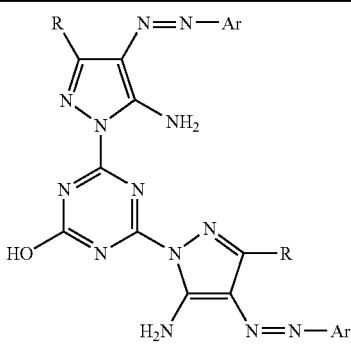

| Dye | R | Ar |
|---|---|---|
| 53 | t-C$_4$H$_9$ | 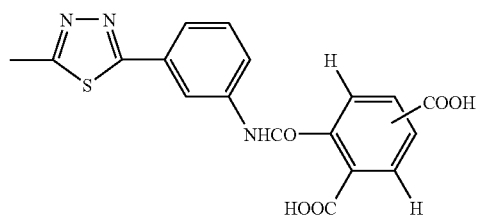 |
| 54 | t-C$_4$H$_9$ | 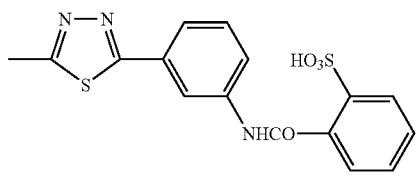 |
| 55 | Ph | 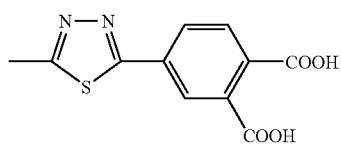 |
| 56 | CH$_3$ | 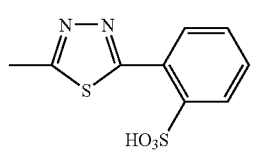 |
| 57 | t-C$_4$H$_9$ | 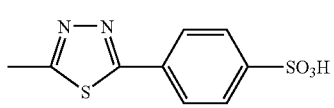 |

The dyes of the invention can be synthesized according to the process for synthesizing Dye 1 to be described hereinafter.

As the use of the dyes of the invention, there are illustrated image recording materials for forming an image, particularly a color image and, specifically, an ink jet recording material to be described in detail hereinafter, a thermal recording material, a pressure-sensitive recording material, a recording material for electrophotography, a transfer type silver halide light-sensitive material, a printing ink and a recording pen and, preferably an ink jet recording material, a thermal recording material and a recording material for electrophotography and, more preferably an ink jet recording material.

Also, the dyes of the invention can be applied to color filters for recording and reproducing a color image to be used in solid imaging devices such as CCD or displays such as LCD and PDP, and to a dyeing solution for dyeing various fibers.

Physical properties, such as solubility, dispersibility and thermal mobility, of the dyes of the invention are adjusted to be suited for the use by selecting substituents therein. Also, the dyes of the invention may be used in a dissolved state, an emulsified emulsion state, or a solid dispersion state depending upon the system to be employed.

(Ink)

The ink of the invention means an ink containing at least one dye of the invention. The ink of the invention can contain a medium and, in the case of using a solvent as the medium, the ink is particularly preferred as an ink jet recording ink. The ink of the invention can be prepared by using an oleophilic medium or an aqueous medium as the medium and dissolving and/or dispersing the dye of the invention in the medium. An ink using an aqueous medium is preferred. The ink of the invention can contain, as needed, other additives within a range not damaging the effects of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor and a chelating agent. In the case of water-soluble inks, these various additives are added directly to the ink solution. In the case of using an oil-soluble dye as a dispersion, it is general to add to a dispersion after preparing a dye dispersion, but the oil-soluble dye may be added to an oil phase or an aqueous phase upon preparation.

In the case of dispersing the dye of the invention in an aqueous medium, it is preferred to disperse colored fine particles containing a dye and an oil-soluble polymer in an aqueous medium as described in JP-A-11-286637, JP-A-2001-240763 (Japanese Patent Application No. 2000-78491), JP-A-2001-262039 (Japanese Patent Application No. 2000-80259) and JP-A-2001-247788 (Japanese Patent Application No. 2000-62370), or to disperse the dye of the invention dissolved in a high-boiling organic solvent in an aqueous solution as described in JP-A-2001-262018 (Japanese Patent Application No. 2000-78454), JP-A-2001-240763 (Japanese Patent Application No. 2000-78491), JP-A-2001-335734 (Japanese Patent Application No. 2000-203856) and Japanese Patent Application No. 2000-203857. In the case of dispersing the dye of the invention in an aqueous medium, specific methods to be employed, oil-soluble polymers, high-boiling organic solvents, additives and the amounts thereof to be used, those described in the foregoing patent documents can preferably be used. Alternatively, the azo dyes of the invention may be dispersed as solids in a fine particle state. Upon dispersing, a dispersing agent or a surfactant can be used. As a dispersing apparatus, a simple stirrer or impeller, an inline-stirring apparatus, a mill (e.g., a colloid mill, a ball mill, a sand mill, an attritor, a roll mill or an agitator), an ultrasonic wave apparatus or a high-pressure emulsifying apparatus (a high-pressure homogenizer; examples of a specific commercially available apparatus including a GAULIN homogenizer, a microfluidizer and DeBEE2000) may be used. As to methods for preparing the above-mentioned ink for ink jet recording, detailed descriptions are given in JP-A-5-148436, JP-A-5-295312, JP-A-7-97541, JP-A-7-82515, JP-A-7-118584, JP-A-11-286637 and JP-A-2001-271003 (Japanese Patent Application No. 2000-87539) in addition to the aforementioned patent documents, which can be applied to preparation of the ink of the invention for ink jet recording.

As the aforementioned aqueous medium, a mixture containing water as a major component and, as needed, a water-miscible organic solvent can be used. Examples of the water-miscible organic solvent to be used include those which are described in JP-A-2003-306623.

Additionally, the water-miscible organic solvents may be used in combination of two or more thereof.

The dye of the invention is contained in the ink of the invention for ink jet recording in an amount of preferably from 0.1 to 120 parts by weight, more preferably from 0.2 to 10 parts by weight, still more preferably from 0.5 to 9 parts by weight, per. 100 parts by weight of the ink. Additionally, in the ink of the invention for ink jet recording, other dyes may be used in combination with the dye of the invention. In the case of using two or more dyes in combination, the sum amount of the dyes is preferably within the aforementioned range.

The ink of the invention can be used for forming not only a mono-color image but a full color image as well. In order to form a full color image, a magenta color ink, a cyan color ink and a yellow color ink can be used. Also, in order to adjust color tone, a black color ink may further be used.

Further, the ink of the invention for ink jet recording can contain other yellow dye than the dye of the invention together with the dye of the invention. As the employable yellow dye, employable magenta dye and employable cyan dye, any dye may be used, and those dyes which are described in JP-A-2003-306623, paragraphs 0090 to 0092 can be utilized. Examples of employable black material include disazo, trisazo and tetraazo dyes and a dispersion of carbon black.

(Ink Jet Recording Method)

The ink jet recording method of the invention forms an image on a known image-receiving material, i.e., plain paper, resin-coated paper, paper exclusively for ink jet recording described in, for example, JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, paper for both ink jet recording and electrophotographic recording, cloth, glass, metal or pottery by imparting energy to the ink for ink jet recording. Additionally, as the ink jet recording method of the invention, descriptions in JP-A-2003-306623, paragraphs 0093 to 0105 can be referred to.

Upon formation of an image, a polymer latex compound may simultaneously be used for the purpose of imparting gloss or water resistance or improving weatherability. As to the stage for adding a latex compound to an image-receiving material, it may be added before or after adding the coloring agent, or may be simultaneously with the addition of the coloring agent. Therefore, as to the position to which the latex compound is added, the latex compound may be added to an image-receiving paper or to an ink, or the latex compound may be used as a liquid material of a polymer latex alone.

Specifically, those methods which are described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944), JP-A-2002-080759 (Japanese Patent Application No. 2000-268952), Japanese Patent Application No. 2000-299465 and Japanese Patent Application No. 2000-297365 can preferably be used.

(Color Toner)

The content of the dye of the invention per 100 parts by weight of the color toner of the invention is not particularly limited, but is preferably 0.1 part by weight or more, more preferably 1 to 10 parts by weight, most preferably 2 to 10 parts by weight.

As the binder resin for the color toner into which the dye of the invention is introduced, any of all binders commonly used may be used. Examples thereof include a styrene-based resin, an acryl resin, a styrene/acryl resin and a polyester resin.

For the purpose of improving flowability or for controlling electrostatic charge, inorganic fine powders or organic fine particles may be externally added to the toner. Silica fine particles and titania fine particles surface-treated with a coupling agent containing an alkyl group are preferably used. Additionally, these have a number average primary particle diameter of preferably 10 to 500 nm, and are added to the toner in a content of 0.1 to 20% by weight.

As the release agent, any of conventionally used release agents can be used. Specific examples thereof include olefins such as low molecular polypropylene, low molecular polyethylene and ethylene-propylene copolymer, and waxes such as microcrystalline wax, carnauba wax, sazol wax and paraffin wax. The addition amount thereof is preferably 1 to 5% by weight in the toner.

The charge controlling agent may be added as needed and, in view of color forming properties, colorless agents are preferred. Examples thereof include those of quaternary ammonium salt structure and those of calixarene structure.

As the carrier, any of non-coated carriers constituted by particles of magnetic material (such as iron or ferrite) alone and resin-coated carriers comprising magnetic material particles whose surface is coated with a resin may be used. The average particle size of the carrier is preferably 30 to 150 µm in terms of volume average particle.

The image-forming method to which the toner of the invention is applied is not particularly limited, and examples thereof include an image-forming method by repeatedly forming a color image and transferring it, a method of forming a color image by successively transferring an image formed on an electrophotographic photoreceptor, and a method of forming a color image by successively transferring an image formed on an electrophotographic photoreceptor onto an intermediate transfer body to form a color image on the intermediate transfer body and transferring the color image onto an image-forming member such as paper.

(Thermally Recording (Transferring) Material)

The thermally recording material is constituted by an ink sheet comprising a support having coated thereon the dye of the invention together with a binder, and an image-receiving sheet for immobilizing the dye traveled in conformity with a thermal energy added from a thermal head according to image-recording signals. The ink sheet can be formed by dissolving the compound of the invention in a solvent together with a binder or dispersing it as fine particles in a solvent to prepare an ink solution, coating the ink solution on a support, and drying the coated ink solution. The amount of the ink to be coated on the support is not particularly limited, but is preferably 30 to 1000 mg/m$^2$. As preferred binder resin, ink solvent, support and, further, an image-receiving sheet, those which are described in JP-A-7-137466 can preferably be used.

In using the thermally recording material as a thermally recording material capable of recording a full color image, it is preferred to form it by successively coating on a support a cyan ink sheet containing a thermally diffusible cyan dye which can form a cyan image, a magenta ink sheet containing a thermally diffusible magenta dye which can form a magenta image, and a yellow ink sheet containing a thermally diffusible yellow dye which can form a yellow image. Also, an ink sheet containing a black image-forming substance may further be formed as needed.

(Color Filter)

As a method for forming a color filter, there are a method of first forming a pattern by a photo resist and then dyeing, and a method of forming a pattern by a photo resist containing a dye as described in JP-A-4-163552, JP-A-4-128703 and JP-A-4-175753. As a method to be employed in the case of introducing the dye of the invention into a color filter, any of these methods may be employed. As a preferred method, there can be illustrated a method of forming a color filter which comprises exposing a positive-working composition comprising a thermosetting composition, a quinonediazide compound, a cross-linking agent, a dye and a solvent and coated on a substrate through a mask, developing the exposed portion to form a positive resist pattern, exposing the whole positive resist pattern, then setting the exposed resist pattern, as described in JP-A-4-175753 and JP-A-6-35182. Also, an RGB primary color-based color filter or a YMC complementary color-based color filter can be obtained by forming a black matrix according to a conventional manner. With the color filter, too, there are no limits as to the amount of the dye to be used, but a content of 0.1 to 50% by weight is preferred.

As the thermosetting resin, the quinonediazide compound, the cross-linking agent and the solvent to be used in forming the color filter, and the amounts thereof to be used, those which are described in the aforesaid patent documents can preferably be used.

EXAMPLES

The present invention is described in more detail with reference to the following examples, but the invention should not be construed as being limited thereto.

Example 1

As a typical example, a process for synthesizing Dye 1 is described below. Each step in the synthesis example can be conducted according to known synthesizing processes (reference can be made to JP-A-2003-277662 and the specification of Japanese patent application No. 2003-286844).

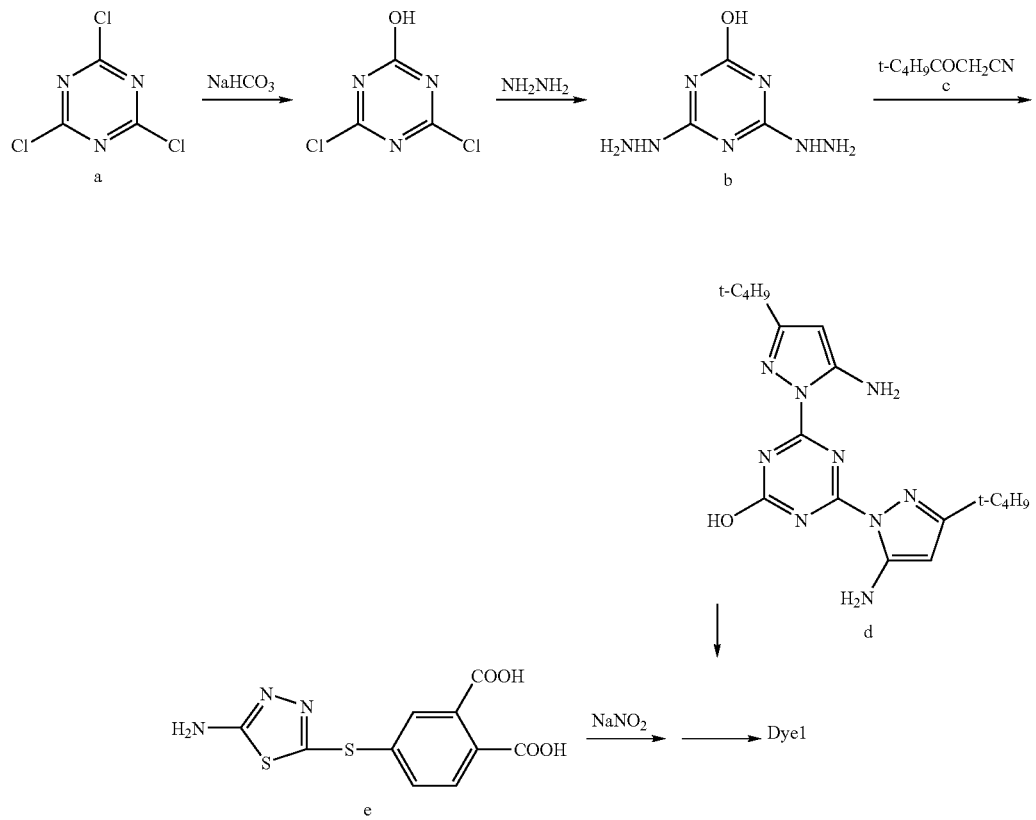

Synthesis Example (1) 18.5 g of $NaHCO_3$ and 185 ml of $H_2O$ were heated to 40° C., and a solution of 18.4 g of compound a in 48 ml of acetone was added thereto, followed by stirring for one hour. After concentrating the reaction solution to reduce the amount of acetone, 40 g of hydrazine was added thereto, and the mixture was stirred for 3 hours at room temperature. Crystals thus precipitated were collected by filtration to obtain 14 g of compound b.

(2) 10 ml of 1N NaOH was added to a mixture of 10.5 g of compound b, 20 g of compound c and 330 ml of $H_2O$, and the resulting mixture was heated for 3 hours. The reaction mixture was filtered, and the filtrate was acidified with acetic acid. Crystals thus precipitated were collected by filtration to obtain 4 g of compound d.

(3) 15 g of compound e was diazotized and was added to a mixture of 3 g of compound d, 100 ml of $CH_3OH$ and 16 g of $CH_3COOK$ at 5° C. Crystals thus precipitated were collected by filtration and were subjected to column chromatography to obtain 4.9 g of Dye 1.

λmax 451.7 nm ($H_2O$), ε: 5.88×10$^4$ ($dm^3 \cdot cm/mol$).

Other dyes can be synthesized in the same manner.

Example 2

Synthesis example for synthesizing Dye 20 is described below. Dye 20 can be similarly synthesized by applying the synthesis process for synthesizing Dye 1. λmax of the synthesized dye in $H_2O$ is shown in Table 1.

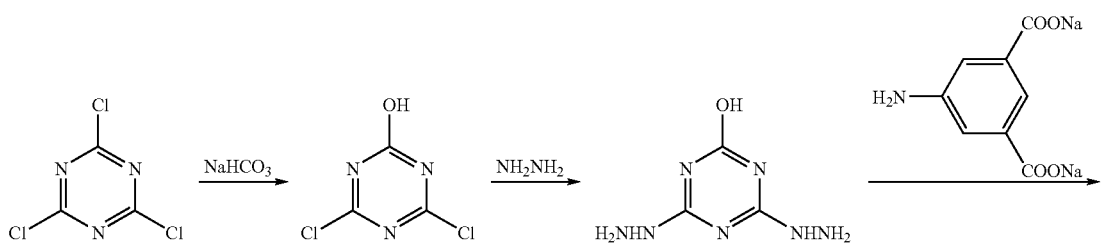

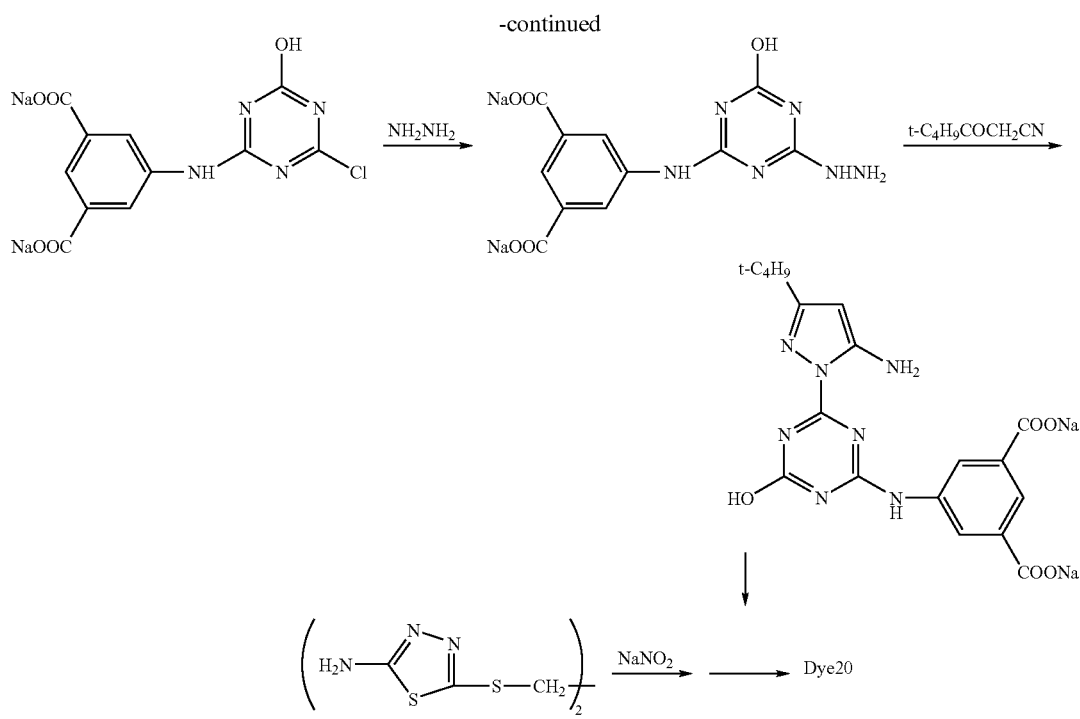

TABLE 1

| Dye | λmax (H$_2$O) |
|---|---|
| 3 | 452 nm |
| 20 | 422 nm |
| 21 | 421 nm |
| 28 | 450 nm |
| 40 | 456.8 nm |
| 41 | 463.1 nm |
| 44 | 453.6 nm |

Example 3

Ultrapure water (resistance value: 18 MΩ or more) was added to the following components to make 1 liter, and the resulting mixture was stirred for one hour under heating. Thereafter, the mixture was filtered under reduced pressure through a microfilter of 0.25 μm to prepare a yellow ink solution Y-101.

(Formulation of Yellow Ink Y-101)

| (Solid components) | |
|---|---|
| Dye 1 of the invention | 40 g/l |
| Proxel (manufactured by Zeneca) | 1.5 g/l |
| Urea | 20 g/l |
| (Liquid components) | |
| Triethylene glycol monobutyl ether (DGB) | 100 g/l |
| Glycerin (GR) | 115 g/l |
| Triethylene glycol (TEG) | 100 g/l |
| 2-Pyrrolidone | 35 g/l |
| Triethanolamine (TEA) | 8 g/l |
| Surfynol STG (SW) | 10 g/l |

An ink solution Y-102 was prepared in the same manner as with preparation of ink solution Y-101 except for changing the dye as shown in the following Table 2.

In this occasion, ink solutions 101 and 102 were prepared as comparative ink solutions using comparative dyes a and b shown in Table 2.

In changing the dye, the addition amount of the dye was adjusted to be equimolar to the dye in the ink solution Y-101.

The inks for ink jet recording prepared in Examples (ink solutions Y101 and Y102) and Comparative Examples (ink solutions 101 and 102) were subjected to the following evaluations. The results are shown in Table 2.

Additionally, in Table 2, "color tone", "light resistance", "ozone (gas) resistance" and "thermal fastness" were evaluated by charging each of the inks for ink jet recording in a cartridge for yellow ink of an ink jet printer PM920C made by EPSON and printing a mono-color image pattern wherein the image density is changed stepwise and a gray image pattern. The image was printed on an image-receiving sheet, "Kotaku", which is a photographic paper adapted for the EPSON ink jet printer, and was evaluated as to image quality and image fastness.

(Evaluation Tests)

<Color Tone>

The color tone was visually evaluated in three grades of A (best), B (good) and C (bad). The λmax value on the photographic paper "Kotaku" was also shown.

<Light Resistance>

The image density Ci immediately after printing was measured by means of a reflection densitometer (X-rite 310TR). Then, the image was irradiated with a xenon light (85,000 lux) for 7 days using a weather meter made by Atlas, and the image density Cf was measured to determine the dye-remaining ratio, Cf/Ci×100, for evaluation. The dye-remaining ratio was evaluated at three points where the reflection densities were 1, 1.5 and 2, respectively. A sample which showed the dye-remaining ratio of 70% or more at the three densities was rated A, a sample which showed the dye-remaining ratio of less than 70% at two of the three densities was rated B, and a sample which showed the dye-remaining ratio of less than 70% at all of the three densities was rated C.

<Ozone (Gas) Resistance>

The image-formed photographic paper was left for 10 days in a box wherein the ozone gas density was adjusted to 5 ppm, and the image density was measured before and after leaving the paper in the ozone gas atmosphere using a reflection densitometer (X-rite 310TR) to determine the dye-remaining ratio. Additionally, the reflection density was measured at three points where the densities were 1, 1.5 and 2.0, respectively. The ozone gas density within the box was monitored by means of an ozone gas monitor (model: OZG-EM-01) made by APPLICS.

The evaluation was conducted in three grades. That is, a sample which showed the dye-remaining ratio of 80% or more at all of the three densities was rated A, a sample which showed the dye-remaining ratio of less than 80% at one or two of the three densities was rated B, and a sample which showed the dye-remaining ratio of less than 70% at all of the three densities was rated C.

<Thermal Fastness>

Image density of a sample was measured before and after storing the sample for 10 days under the conditions of 80° C. and 70% RH using a reflection densitometer (X-rite 310TR) for evaluation. The dye-remaining ratio was determined at three points of 1, 1.5 and 2 in reflection density. A sample which showed the dye-remaining ratio of 90% or more at all of the three densities was rated A, a sample which showed the dye-remaining ratio of less than 90% at two of the three densities was rated B, and a sample which showed the dye-remaining ratio of less than 90% at all of the three densities was rated C.

<Ink Stability>

The above-obtained ink solutions were stored at 70° C. for 6 days, and the dye-remaining ratio was determined by liquid chromatography for evaluation. An ink solution showing the dye-remaining ratio of 95% or more was rated A, an ink solution showing the dye-remaining ratio of 85% to less than 95% was rated B, and an ink solution showing the dye-remaining ratio of less than 85% was rated C.

The results thus obtained are tabulated below.

TABLE 2

| Sample | Dye | Color Tone ($\lambda$max) | Light Resistance | Ozone Resistance | Thermal Fastness | Ink Stability | Note |
|---|---|---|---|---|---|---|---|
| Y101 | 1 | A (455 nm) | A | A | A | A | invention |
| Y102 | 4 | A (453 nm) | A | A | A | A | invention |
| 101 | a | A (446 nm) | A | A | A | B | Comparative Example |
| 102 | b | A (448 nm) | A | A | A | C | Comparative Example |

As is apparent from the results tabulated above, it is seen that all of the systems using the ink of the invention are excellent in all factors. In particular, they are excellent in ink stability in comparison with the systems of Comparative Examples.

Comparative Dye a

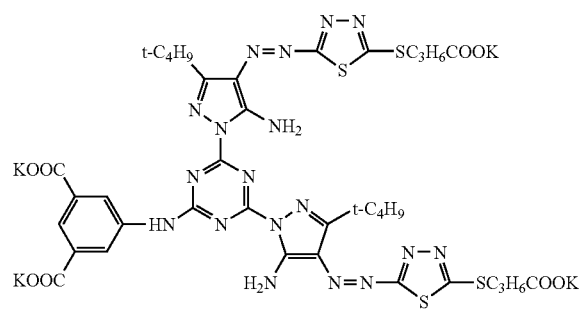

Comparative Dye b

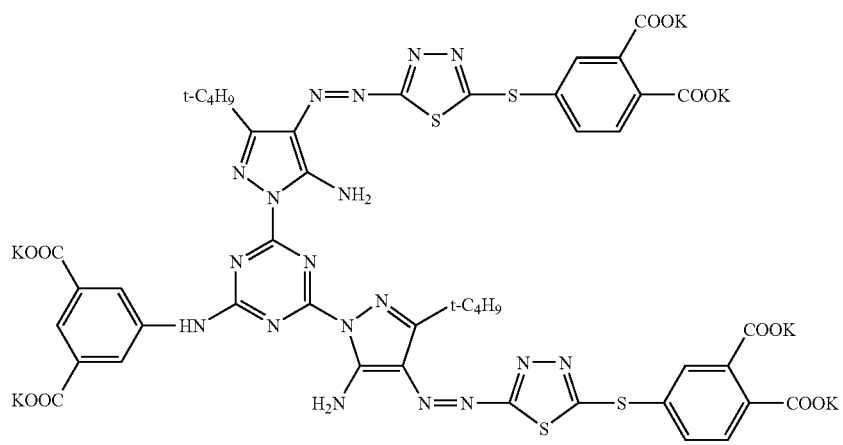

Example 4

When an image was printed on ink jet paper of photographic glossy paper "Gasai" made by Fuji Photo Film Co., Ltd. using the same ink and the same printer as were used in Example 3 and then subjected to the same evaluation as in Example 3, there were obtained the same results as in Example 3.

Example 5

(Preparation of Ink Solution D)

62.5 g of the dye of the invention and 7.04 g of sodium dioctylsulfosuccinate were dissolved in a mixture of 4.22 of the following high-boiling organic solvent (s-2), 5.63 g of the following high-boiling organic solvent (s-11) and 50 ml of ethyl acetate at 70° C. To this mixture solution was added deionized water under stirring with a magnetic stirrer to prepare an oil-in-water coarse dispersion. Subsequently, the resultant coarse mixture was passed 5 times through a microfluidizer (MICROFLUIDEX INC) under a pressure of 600 bar to reduce the size of the oil droplets. Further, the resultant emulsion was subjected to solvent-removing procedure in a rotary evaporator till smell of ethyl acetate was not detected. To the thus-obtained fine emulsion of the hydrophobic dye were added 140 g of diethylene glycol, 50 g of glycerin, 7 g of SURFYNOL 465 (Air Products & Chemicals) and 900 ml of deionized water to prepare ink solution D. This ink had a pH of 8.5, a viscosity of 4.1 mPa·S and a surface tension of 33 mN/m.

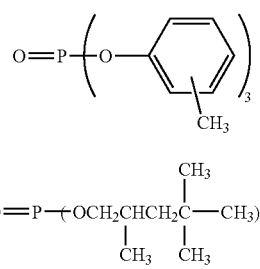

(Preparation of Ink Solution 103)

Ink solution 103 was prepared in the same manner as with the ink solution D except for changing the dye of the invention used in the ink solution D to an equimolar amount of the comparative dye shown in Table 3. The ink solution had the same pH, the same viscosity and the same surface tension as those of the ink solution D.

(Image Recording and Evaluation)

The ink solution D and the comparative ink solution 103 were subjected to the following evaluation. The results are shown in the following Table 3.

Additionally, in Table 3, "color tone (λmax)", "light resistance", "ozone (gas) resistance", "thermal fastness" and "ink stability" have respectively the same meanings as described in Example 3.

TABLE 3

| Sample | Dye | Color Tone (λmax) | Light Resistance | Ozone Resistance | Thermal Fastness | Ink Stability |
|---|---|---|---|---|---|---|
| D | 6 | A (450 nm) | A | A | A | A |
| 103 | Comparative dye C4 | B (430 nm) | C | C | A | A |

Comparative Dye C

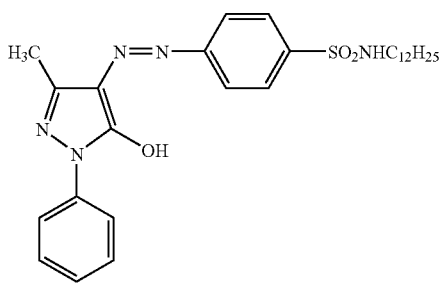

As is apparent from Table 3, the ink of the invention for ink jet recording was excellent in color tone, light resistance, ozone resistance, thermal fastness and ink stability.

Example 6

When an image was printed on ink jet paper of photographic glossy paper "Gasai" made by Fuji Photo Film Co., Ltd. using the same ink and the same printer as were used in Example 5 and then subjected to the same evaluation as in Example 5, there were obtained the same results as in Example 5.

Example 7

3 Parts by weight of Dye 5 of the invention and 100 parts by weight of a resin for toner (styrene-acxylate copolymer; trade name: Himer TB-1000F (manufactured by Sanyo Chemical Industries, Ltd.)) were mixed and pulverized in a ball mill, then heated to 150° C. to conduct melt kneading and, after cooling the mixture, the mixture was crushed by means of a hammer mill, then finely pulverized in a finely pulverizing machine based on air jet system. Further, the resultant fine particles were classified to select particles of 1 to 20 microns in particle size, and a toner was prepared from the selected particles. 10 Parts of the toner was uniformly mixed with 900 parts of a carrier iron powder (trade name: EFV250/400; made by Nihon Teppun) to prepare a developing agent. Likewise, a sample was prepared in the same manner except for using 3 parts by weight of the coloring agent shown in Table 4. Copying was conducted using these developing agents in a dry process electrophotographic copier for plain paper (trade name: NP-5000; made by Canon Co., Ltd.).

Evaluation tests were conducted in the following manner using a reflection image (image on paper) and a transparent image (OHP image) formed on paper and OHP, respectively, by the developing agent containing the color toner of the invention according to the above-mentioned image-forming method. Additionally, the evaluation was conducted within a range of 0.7±0.05 (mg/cm$^2$) in terms of the amount of deposited toner.

Hue and light fastness of the thus-obtained image were evaluated. Hue was visually evaluated in three grades of best, good and bad. Results of the evaluation are shown in Table 4 below. In Table 4, "A" means that hue of the sample was best, "B" means that hue of the sample was good, and "C" means that hue of the sample was bad.

As to light fastness, the image density Ci immediately after recording was measured, then the image was irradiated with a xenon light (85,000 lux) for 5 days using a weather meter (Atlas C.165). Then, the image density Cf was measured to determine the dye-remaining ratio, $\{(Ci-Cf)/Ci\} \times 100\%$, for evaluation based on the difference in image density before and after irradiation with xenon light. The image density was measured by using a reflection densitometer (X-Rite 310TR). The results thus obtained are shown in Table 4 below. In Table 4, a sample which showed the dye-remaining ratio of 90% or more was scored A, a sample which showed the dye-remaining ratio of 90 to 80% was scored B, and a sample which showed the dye-remaining ratio of less than 80% was scored C.

Transparent properties of the OHP image was evaluated according to the method described below. Visible spectral transmittance of the image was measured by means of "Model 330 autographic spectrophotometer" made by Hitachi, Ltd., with OHP sheet not carrying the toner being a reference, to thereby determine the spectral transmittance at 650 nm. The spectral transmittance was used as a measure for transparent properties of the OHP image. A sample showing the spectral transparency of more than 80% was scored A, a sample showing the spectral transparency of 70 to 80% was scored B, and a sample showing the spectral transparency of less than 70% was scored C. The results thus obtained are shown in Table 4.

TABLE 4

| | Dye | Hue | Light fastness | Transparent properties |
|---|---|---|---|---|
| Invention | 5 | A | A | A |
| Comparative Example | C.I. Solvent Yellow 162 | B | B | B |

As is apparent from Table 4, the color toner of the invention realized color reproduction with high fidelity and provided a high OHP quality, and hence it is appropriate for use as a full color toner. Further, the color toner has such a good light fastness that it can provide an image which can be stored for a long period of time.

Example 8

Preparation of a Thermal Transfer Dye-providing Material

A thermal transfer dye-providing material (5-1) was prepared by using as a support a 6-μm thick polyethylene terephthalate film (made by Teijin) the back surface of which had been subjected to heat resistance-imparting and lubricating treatment, and coating on the surface of the film the coating composition of the following formulation for the thermal transfer dye-providing layer in a dry thickness of 1.5 μm according to the wire bar coating method.

Coating Composition for Thermal Transfer Dye-Providing Layer

| | |
|---|---|
| Dye 5 | 10 mmol |
| Polyvinylbutyral resin | 3 g |
| (Denka Butyral 5000-A made by Denki Kagaku) | |
| Toluene | 40 ml |
| Methyl ethyl ketone | 40 ml |
| Polyisocyanate | 0.2 ml |
| (Takenate D110N made by Takeda Yakuhin) | |

Then, a comparative thermal transfer dye-providing material (5-2) was prepared in the same manner as described above except for changing Dye 5 to the comparative dye described in Table 5.

(Preparation of Thermal Transfer Image-Receiving Material)

Thermal transfer image-receiving materials were prepared by using as a support a 150-μm thick synthetic paper (YUPO-FPG-150 made by Oji Yuka) and coating the following composition in a dry thickness of 8 μm according to the wire bar coating method. Drying was conducted for 30 minutes in a 100° C. oven after tentative drying by a drier.

Coating Composition for Image-Receiving Layer

| | |
|---|---|
| Polyester resin (VYLON-280 made by Toyobo) | 22 g |
| Polyisocyanate | 4 g |
| (KP-90 made by Dainippon Ink &Chemicals, Inc.) | |
| Amino-modified silicone oil | 0.5 g |
| (KF-857 made by Shin-etsu Silicone) | |
| Methyl ethyl ketone | 85 ml |
| Toluene | 85 ml |
| Cyclohexanone | 15 ml |

Each of the thus-obtained thermal transfer dye-providing materials (5-1) and (5-2) was superposed on the thermal transfer image-receiving material with the thermal dye-providing layer facing the image-receiving layer, and printing was conducted using a thermal head from the support side of the thermal transfer dye-providing material under the conditions of 0.25 W/dot in output of the thermal head, 0.15 to 15 milliseconds in pulse width and 6 dots/mm in dot density to thereby image wise deposit the yellow dye in the image-receiving layer of the image-receiving material. The maximum coloration density of the thus-obtained image was shown in Table 5. The thermal transfer dye-providing material (5-1) of the invention formed a distinct image with no transfer unevenness. Subsequently, each of the thus-obtained recorded thermal transfer image-receiving materials was irradiated with a Xe light (17,000 lux) for 5 days to examine light fastness of the color images. The status A mode reflection density of a portion which showed a status A reflection density of 1.0 was measured after the irradiation, and the light fastness was evaluated in terms of the residual ratio (percentage) of the reflection density based on the reflection density of 1.0 before the irradiation. The results are shown in Table 5.

TABLE 5

| Thermal transfer dye-providing material | Dye | Maximum density | Light fastness | Note |
|---|---|---|---|---|
| 5-1 | 5 | 1.8 | 90 | Invention |
| 5-2 | Comparative dye d | 1.8 | 52 | Comparative example |

Comparative Dye d

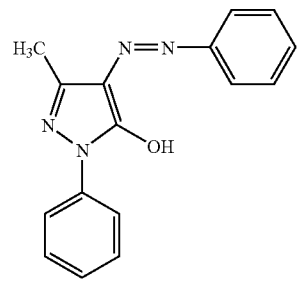

As has been described hereinbefore, the dye of the invention was excellent in comparison with the dye for comparison. Also, hue of the image formed by the dye of the invention was distinct.

Example 9

In preparing a color filter, a positive-working resist composition containing a thermosetting resin, a quinonediazide compound, a cross-linking agent, a dye and a solvent was spin-coated on a silicon wafer and, after evaporating the solvent by heating, the coat was exposed through a mask to decompose the quinonediazide compound.

After heating as needed, the exposed coat was developed to obtain a mosaic pattern. The exposure was conducted by means of an i-ray exposing stepper HITACHI LD-5010-I (NA=0.40) made by Hitachi, Ltd. Also, as the developing solution, SOPD or SOPD-B manufactured by Sumitomo Kagaku Kogyo was used.

<Preparation of the Positive-Working Resist Composition>

3.4 Parts by weight of a cresol novolak resin (weight average molecular weight in terms of polystyrene: 4300) obtained from a mixture of m-cresol/p-cresol/formaldehyde (reaction mol ratio=5/5/7.5), 1.8 parts by weight of o-naphthoquinonediazido-5-sulfonate (on the average 2 hydroxyl groups being esterified) prepared from a phenol compound represented by the following formula of 0.8 part by weight of hexamethoxymethylolmelamine, 20 parts by weight of ethyl lactate and 1 part by weight of the dye of the invention shown in Table 6 were mixed to obtain a positive-working resist composition.

Phenol Compound

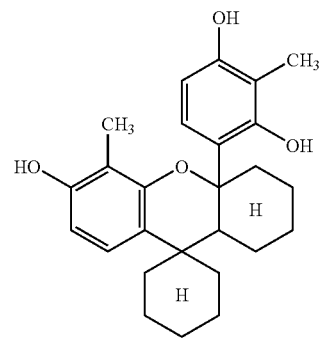

<Preparation of Color Filter>

The thus-obtained positive-working resist composition was coated on a silicon wafer by spin coating, followed by evaporating away the solvent. After exposing the silicon wafer, it was heated at 100° C., then alkali-developed to remove the exposed areas, thus a positive colored pattern of 0.8 µm in resolution being obtained. After exposing the whole pattern, the wafer was heated at 150° C. for 15 minutes to obtain a color filter having a color complementary to yellow.

Comparative Example

A positive-working resist composition was obtained by mixing 1 part by weight of Oleozol Yellow 2G made by Sumitomo Kagaku Kogyo in place of the yellow dye of the invention used in above Example. The thus-obtained positive-working resist composition was coated on a silicon wafer by spin coating, followed by evaporating away the solvent. After exposing the silicon wafer, it was alkali-developed to obtain a positive colored pattern of 1 µm in resolution. After exposing the whole pattern, the wafer was heated at 150° C. for 10 minutes to obtain a yellow color filter.

<Evaluation>

The transparent spectrum of each of the obtained yellow color filter was measured, and sharpness of the spectrum on the shorter wavelength side and on the longer wavelength side, which is of importance in view of color reproduction, was relatively evaluated. "A" represents a good level, "B" represents an acceptable level, and "C" represents an unacceptable level. Also, each of the samples was irradiated with a xenon light (85,000 lux) for 7 days using a weathermeter (Atlas C.I65), and image density was measured before and after the irradiation with the xenon light, and light fastness was evaluated in terms of dye-remaining ratio.

TABLE 6

| | Dye | Absorption characteristics | Light fastness |
|---|---|---|---|
| Invention | 5 | A | 96% |
| Comparative example | Oleozol Yellow 2G | B | 59% |

It is seen that the dye of the invention shows a spectrum wherein sharpness on the shorter wavelength side and on the longer wavelength side is great in comparison with the dye of the Comparative Example, thus being excellent in color reproduction. Also, it is seen that, in comparison with the comparative compound, the dye of the invention is excellent in light fastness.

INDUSTRIAL APPLICABILITY

Dyes of the invention are useful for various coloring compositions capable of providing a colored image or colored material excellent in hue and fastness, such as a printing ink for, for example, ink jet printing, an ink sheet in a thermal recording material, a color toner for electrophotography, a color filter for use in a display such as LCD or PDP or in an imaging device such as CCD, and a dyeing solution for dyeing various fibers.

The present invention has been explained in detail and by referring to specific embodiments, but it will be apparent for those skilled in the art that various modification and alterations can be added within the scope and spirit of the invention.

The entire disclosure of each and every foreign patent application from which the benefit of foreign priority has been claimed in the present application is incorporated herein by reference, as if fully set forth herein.

The invention claimed is:

1. A dye represented by formula (2), (3) or (4):

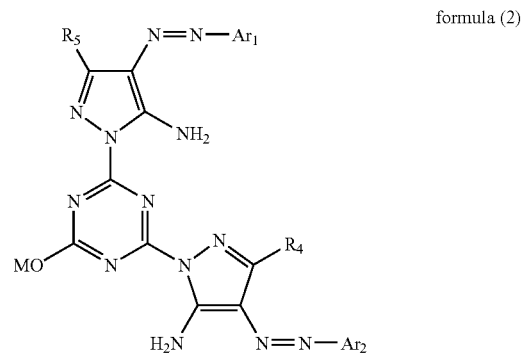

wherein $R_3$ and $R_4$ each independently represents a monovalent group, $Ar_1$ and $Ar_2$ each independently represents an aryl group or a hetero ring group, and M represents a hydrogen atom or a cation;

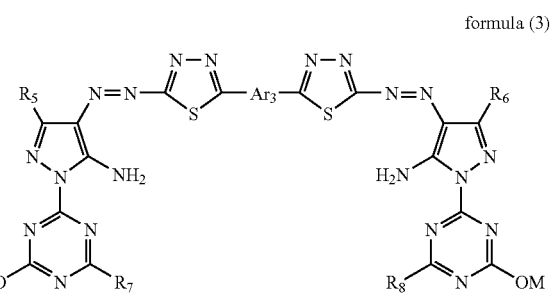

wherein $R_5$, $R_6$, $R_7$, and $R_8$ each independently represents a monovalent group, $Ar_3$ represents a divalent linking group, M represents a hydrogen atom or a cation;

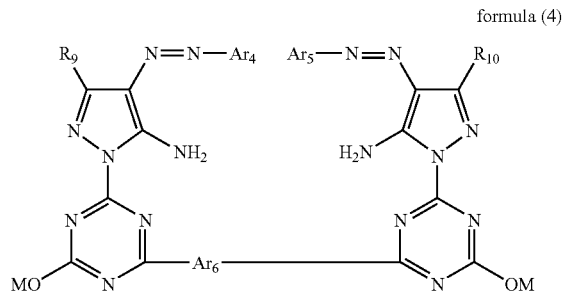

wherein $R_9$ and $R_{10}$ each independently represents a monovalent group, $Ar_4$ and $Ar_5$ each independently represents an aryl group or a hetero ring group, $Ar_6$ represents a divalent linking group, and M represents a hydrogen atom or a cation.

2. The dye according to claim 1, wherein the dye is represented by formula (2).

3. The dye according to claim 2, wherein $Ar_1$ and $Ar_2$ each independently represents a group represented by formula (A):

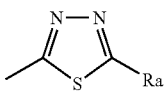

wherein Ra represents a monovalent group.

4. The dye according to claim 1, wherein the dye is represented by formula (3).

5. The dye according to claim 1, wherein the dye is represented by formula (4).

6. The dye according to claim 5, wherein $Ar_3$ and $Ar_4$ each independently represents a group represented by formula (A):

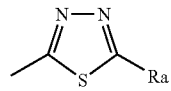

wherein Ra represents a monovalent group.

7. An ink comprising a dye according to any one of claims 1 to 6.

8. An inkjet recording method comprising forming an image by utilizing an ink according to claim 7.

9. An ink sheet comprising a dye according to any one of claims 1 to 6.

10. A color toner comprising a dye according to any one of claims 1 to 6.

11. A color filter comprising a dye according to any one of claims 1 to 6.

* * * * *